US008585065B2

(12) United States Patent
Koide et al.

(10) Patent No.: US 8,585,065 B2
(45) Date of Patent: Nov. 19, 2013

(54) SUSPENSION STRUCTURE AND METHOD OF MAKING SUSPENSION LINK (75) Inventors: Reo Koide, Kawasaki (JP); Kenji Sagara, Isehara (JP); Jiro Inatomi, Yokohama (JP); Kazuhiro Kiriyama, Isehara (JP); Toshiyuki Kondou, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/412,935

(22) Filed: Mar. 6, 2012

(65) Prior Publication Data

US 2012/0292873 A1 Nov. 22, 2012

(30) Foreign Application Priority Data

May 16, 2011 (JP) ................... 2011-109667

(51) Int. Cl.
*B60G 7/02* (2006.01)
(52) U.S. Cl.
USPC ...... 280/124.109; 280/124.132; 280/124.133; 280/124.134
(58) Field of Classification Search
USPC ............... 280/124.132, 124.128, 124.133, 280/124.134, 124.135
See application file for complete search history.

(56) References Cited

U.S. PATENT DOCUMENTS

| 7,261,307 B2 | 8/2007 | Nuno et al. | |
| 2003/0034625 A1* | 2/2003 | Runte et al. | 280/124.134 |
| 2004/0135337 A1* | 7/2004 | Alesso et al. | 280/124.134 |
| 2006/0232038 A1* | 10/2006 | Weise | 280/124.134 |
| 2007/0257463 A1* | 11/2007 | Sanville et al. | 280/124.134 |
| 2009/0295113 A1* | 12/2009 | Inoue et al. | 280/124.134 |
| 2011/0115186 A1* | 5/2011 | Chiku et al. | 280/124.134 |
| 2011/0285102 A1* | 11/2011 | Yu et al. | 280/124.134 |
| 2011/0298192 A1* | 12/2011 | Yu et al. | 280/124.134 |
| 2012/0013095 A1* | 1/2012 | Gerrard | 280/124.134 |
| 2012/0018974 A1* | 1/2012 | Mielke et al. | 280/124.134 |
| 2012/0098228 A1* | 4/2012 | Wilson et al. | 280/124.134 |
| 2012/0299264 A1* | 11/2012 | Pedersen et al. | 280/124.134 |

FOREIGN PATENT DOCUMENTS

| JP | 2006-281975 A | 10/2006 |
| JP | 2009-248718 A | 10/2009 |
| JP | 2010-12882 A | 1/2010 |
| WO | WO 2005/002890 A1 | 1/2005 |

OTHER PUBLICATIONS

U.S. Appl. No. 13/412,903, filed Mar. 6, 2012, Koide et al.
U.S. Appl. No. 13/413,094, filed Mar. 6, 2012, Koide et al.
U.S. Appl. No. 13/413,070, filed Mar. 6, 2012, Koide et al.

* cited by examiner

*Primary Examiner* — Toan To
(74) *Attorney, Agent, or Firm* — Foley & Lardner LLP (57) ABSTRACT In a suspension structure, a suspension link has a hollow structure in which a pair of frame brackets are joined together, while opposing each other. Also provided is a stiffening bracket integrally connected to both the frame brackets for holding and sandwiching the frame brackets together. The stiffening bracket is configured to hold and sandwich both an end face of a first one of the frame brackets facing apart from the mating face with the second frame bracket and an end face of the second frame bracket facing apart from the mating face with the first frame bracket together. One end of a stabilizer, a height sensor, or the like is connected to the stiffening bracket.

9 Claims, 13 Drawing Sheets

ANALYSIS RESULT OF COMBINED-INPUTS DURABILITY

FIG.9B

ANALYSIS RESULT OF ROLL-INPUT DURABILITY

2ND COMPARATIVE STRUCTURE, HAVING ADVANTAGE OF REDUCING STRESSES OCCURRING OWING TO TORSIONAL DEFLECTION OF LINK IN COMBINED-INPUTS DURABILITY, BUT HAVING DISADVANTAGE OF OCCURRING HIGH STRESSES IN WELDED PORTIONS IN ROLL-INPUT DURABILITY

FIG.10A

ANALYSIS RESULT OF COMBINED-INPUTS DURABILITY

FRONT OF VEHICLE
OUTBOARD SIDE OF VEHICLE

FIG.10B

SUSPENSION STRUCTURE OF EMBODIMENT, HAVING ADVANTAGE OF REDUCING STRESSES TO HALF THAN WITH 1ST COMPARATIVE STRUCTURE

FRONT OF VEHICLE
OUTBOARD SIDE OF VEHICLE

SUSPENSION STRUCTURE AND METHOD OF MAKING SUSPENSION LINK

TECHNICAL FIELD

The present invention relates to a suspension structure and a method of making a suspension link.

BACKGROUND ART

In recent years, there have been proposed and developed various multi-link suspensions in which a suspension link is formed into a hollow structure, and a coil spring, a shock absorber, a stabilizer, and so forth are connected to the suspension link. One such suspension structure has been disclosed in International Publication No. WO2005/002890 (hereinafter is referred to as "WO2005/002890"). However, WO2005/002890 merely teaches the suspension link having a hollow structure. In such a hollow-structure suspension link as disclosed in WO2005/002890, there is a possibility of reduced durability of the suspension link owing to the occurrence of a stress concentration (high localized stresses) in the suspension link, induced by a load input from a coil spring, a shock absorber, a stabilizer, and so forth. It would be desirable to provide a more improved suspension structure by which the durability of a suspension link can be enhanced.

SUMMARY OF THE INVENTION

It is, therefore, in view of the previously-described disadvantages of the prior art, an object of the invention to provide a suspension structure and a method of making a suspension link, by which the durability of the suspension link can be certainly enhanced, thereby ensuring the increased life of the suspension system.

In order to accomplish the aforementioned and other objects of the present invention, a suspension structure comprises a suspension link through which a road wheel and a vehicle body are pivotably connected to each other, the suspension link having a hollow structure in which a pair of frame brackets are joined together, while opposing each other, and a stiffening bracket integrally connected to both the frame brackets for holding and sandwiching the frame brackets together.

According to another aspect of the invention, a method of making a suspension link, comprises joining a pair of frame brackets together, while opposing each other, to provide a hollow structure, and integrally connecting a stiffening bracket to both the frame brackets, for holding and sandwiching the frame brackets together.

The other objects and features of this invention will become understood from the following description with reference to the accompanying drawings.

DESCRIPTION OF THE PREFERRED EMBODIMENTS

Hereinafter explained in reference to the drawings is the construction of the rear suspension of an automotive vehicle to which the suspension assembling structure of the embodiment can be applied.

First Embodiment

[Construction]

Figure 1:
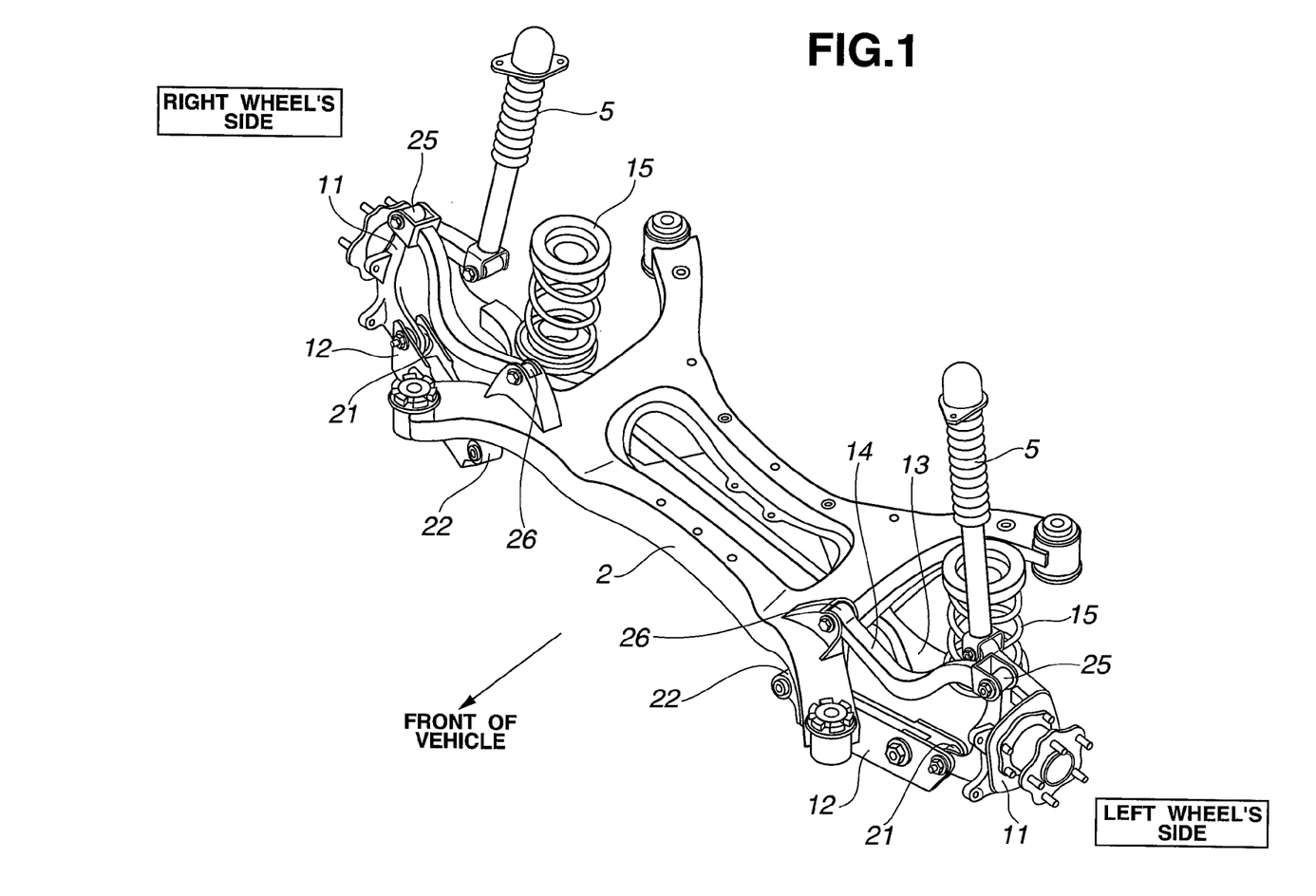
FIG. 1 is a perspective view illustrating the construction of an embodiment of a multi-link rear suspension.
Figure 2:
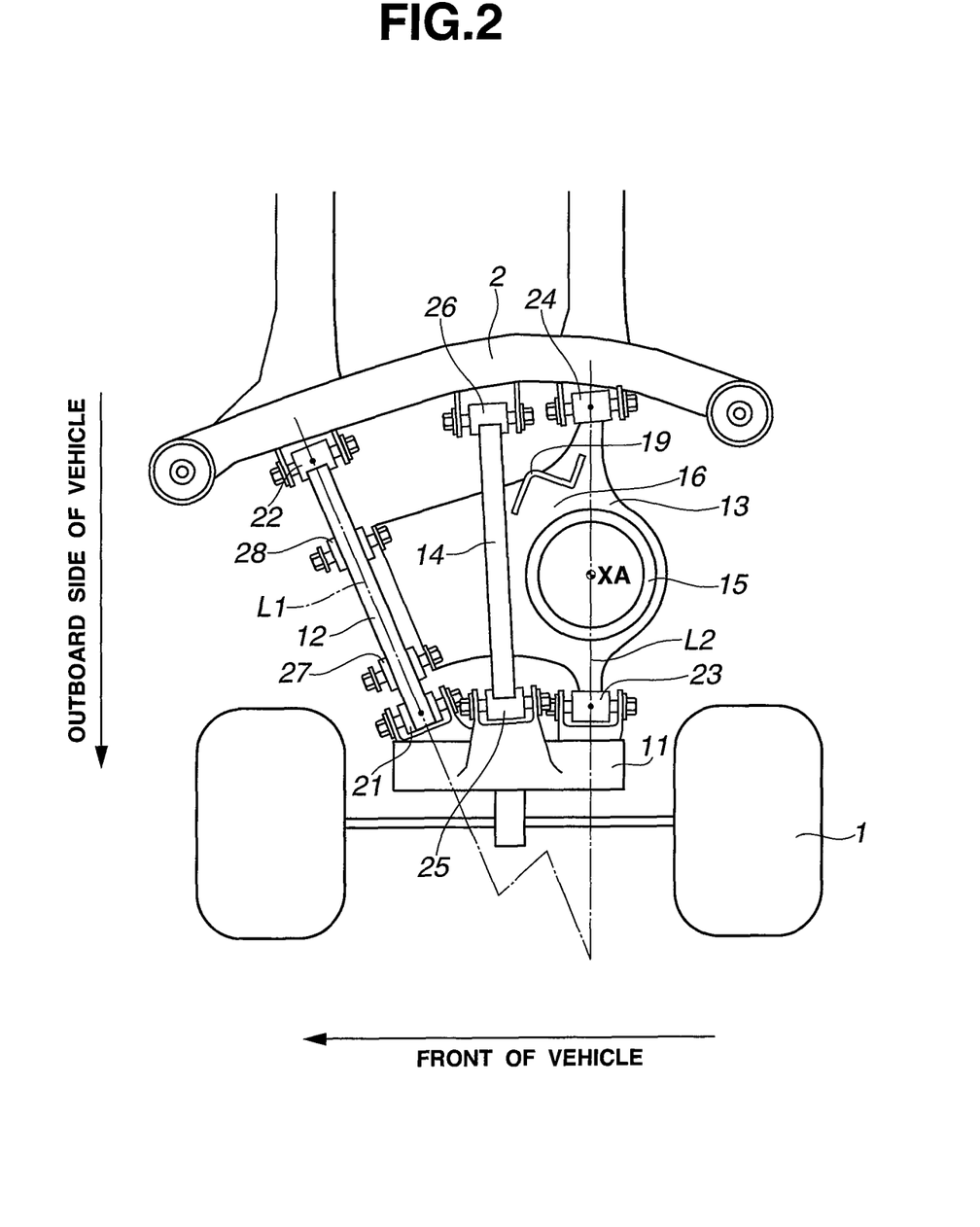
FIG. 2 is a top view illustrating the construction of the rear-left suspension of the embodiment.
Figure 3:
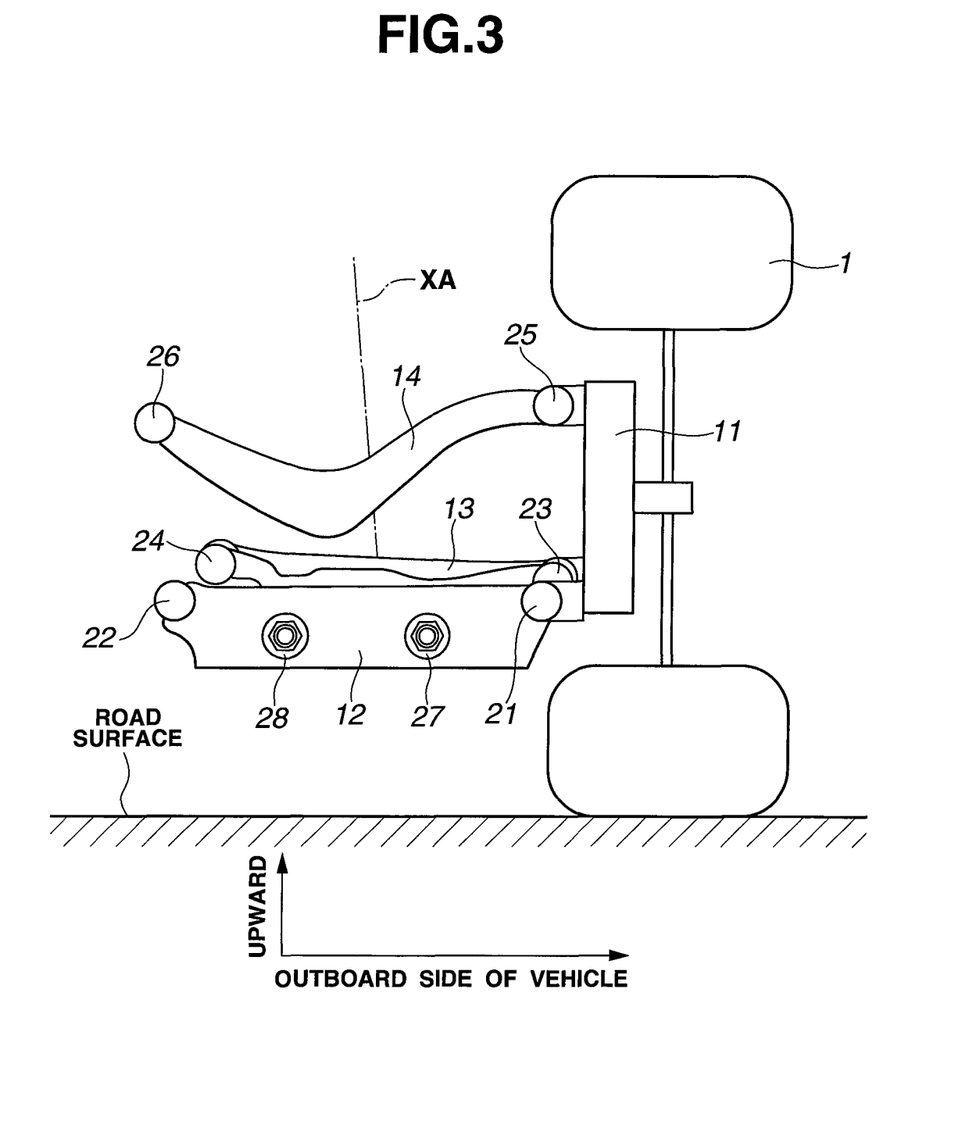
FIG. 3 is a front elevation view illustrating the construction of the rear-left suspension of the embodiment.

FIG. 1 is the perspective view illustrating the construction of the multi-link rear suspension of the embodiment under an assembled state. FIG. 2 is the top view illustrating the construction of the rear-left suspension of the embodiment under the assembled state. FIG. 3 is the front elevation view illustrating the construction of the rear-left suspension of the embodiment under the assembled state.

The suspension structure of the embodiment is exemplified in an independently-suspended rear-left road-wheel suspension, simply, an independent rear-left suspension.

As shown in FIG. 1, the suspension structure is provided for suspending a road wheel 1 from a suspension member 2 of the vehicle-body side, and comprised of an axle housing 11 (a hub carrier), a lower front link 12, a lower rear link 13, an upper link 14, a coil spring 15, and a strut 5.

Axle housing 11 is configured to rotatably support the road wheel 1.

Under the assembled state, lower front link 12 and lower rear link 13 are located to be almost level with each other, and juxtaposed to each other substantially in the longitudinal direction of the vehicle body.

Lower front link 12 is configured to be pivotably connected at one end of the outboard side of the vehicle to the lower front part of axle housing 11 through a bush 21, and also configured to be pivotably connected at the other end of the inboard side of the vehicle to the lower front part of suspension member 2 through a bush 22. In the plan view (see FIG. 2), regarding the positions of these connection points in the longitudinal direction of the vehicle body, the connection point (i.e., bush 21) of the outboard side of the vehicle is positioned somewhat rearward with respect to the connection point (i.e., bush 22) of the inboard side of the vehicle.

Lower rear link 13 is configured to be pivotably connected at one end of the outboard side of the vehicle to the lower rear part of axle housing 11 through a bush 23, and also configured to be pivotably connected at the other end of the inboard side of the vehicle to the lower rear part of suspension member 2 through a bush 24. In the plan view (see FIG. 2), regarding the positions of these connection points in the longitudinal direction of the vehicle body, the connection point (i.e., bush 23) of the outboard side of the vehicle and the connection point (i.e., bush 24) of the inboard side of the vehicle are positioned to be almost the same longitudinal position.

The distance between the connection point (i.e., bush 21) of lower front link 12 to axle housing 11 and the connection point (i.e., bush 23) of lower rear link 13 to axle housing 11 is dimensioned to be shorter than the distance between the connection point (i.e., bush 22) of lower front link 12 to suspension member 2 and the connection point (i.e., bush 24) of lower rear link 13 to suspension member 2. That is, a straight line L1 (i.e., the axis of lower front link 12) passing through the connection points corresponding to bushes 21-22 and a straight line L2 (i.e., the axis of lower rear link 13) passing through the connection points corresponding to bushes 23-24 intersect with each other on the outboard side of the vehicle.

Upper link 14 is configured to be pivotably connected at one end of the outboard side of the vehicle to the upper part of axle housing 11 through a bush 25, and also configured to be pivotably connected at the other end of the inboard side of the vehicle to the upper part of suspension member 2 through a bush 26.

Each of bushes 21-26 is comprised of outer and inner cylinders (outer and inner tubes) nested each other, and an elastic body formed of a rubber medium and interleaved between the inner and outer cylinders. In the shown embodiment, both ends of each of lower front link 12, lower rear link 13, and upper link 14 are connected to the outer cylinders of the associated bushes. The inner cylinders of bushes 21, 23, and 25 are connected to axle housing 11, whereas the inner cylinders of bushes 22, 24, and 26 are connected to suspension member 2.

Lower rear link 13 is formed integral with an overhanging portion 16, extending toward the lower front link 12. The front end of overhanging portion 16 extending in the longitudinal direction of the vehicle body is connected to the lower front link 12 via bushes 27 and 28 in a manner so as to permit a displacement of the overhanging portion relative to the lower front link.

Bushes 27 and 28 are arranged along the lower front link 12. Each of bushes 27-28 is comprised of outer and inner cylinders nested each other, and an elastic body formed of a rubber medium and interleaved between the inner and outer cylinders. In the shown embodiment, the bush axis of each of bushes 27-28 is directed substantially in the longitudinal direction of the vehicle. The outer cylinder of each of bushes 27-28 is connected to the lower front link 12, whereas the inner cylinder of each of bushes 27-28 is connected to the front end of overhanging portion 16.

A displacement of overhanging portion 16 and lower rear link 13 relative to the lower front link 12 can be permitted within a movable range (a deflectable range), determined based on a deflection (a flexibility) of each of bushes 27-28. By the way, in the shown embodiment, each of bushes 27-28 has a stiffness anisotropy that a lateral stiffness in the lateral direction of the vehicle is lower than a vertical stiffness in the vertical direction of the vehicle.

Toe control during braking is hereinafter described in detail.

In the presence of a braking force input to road wheel 1, resulting from braking torque application, axle housing 11 tends to be displaced in the rearward direction of the vehicle body. At this time, a longitudinal displacement of the rearward-displaced connection point (i.e., bush 21) of lower front link 12 to axle housing 11 and a longitudinal displacement of the rearward-displaced connection point (i.e., bush 23) of lower rear link 13 to axle housing 11 become almost the same. However, regarding lateral displacements of these connecting points toward the inboard side of the vehicle, owing to the previously-noted arrangement of straight lines L1 and L2, a lateral displacement of the connection point (i.e., bush 21) of lower front link 12 tends to become greater than a lateral displacement of the connection point (i.e., bush 23) of lower rear link 13. That is, the connection point (i.e., bush 21) of the lower front part of axle housing 11 tends to be pulled toward the inboard side of the vehicle. Therefore, during braking, a toe motion change of road wheel 1 in a toe-in direction occurs, thus enhancing handling and stability of the vehicle.

Details of coil spring 15 are hereinafter described.

Coil spring 15, whose axis XA is a substantially vertical direction of the vehicle, is interleaved between the vehicle body and lower rear link 13. In the plan view, the position of coil spring 15 is arranged to overlap with the straight line L2. It is preferable to place the coil axis XA on the straight line L2.

In the shown embodiment, coil spring 15 is mounted substantially at a midpoint of the connection point (i.e., bush 23) of the outboard side of the vehicle and the connection point (i.e., bush 24) of the inboard side of the vehicle. A bearing surface of the coil end of coil spring 15 is laid out to overlap the overhanging portion 16 in such a manner as to enlarge the contour of the rear end of lower rear link 13 depending on the outside diameter of coil spring 15.

The assembling structure of coil spring 15 is hereinafter described.

Figure 4:
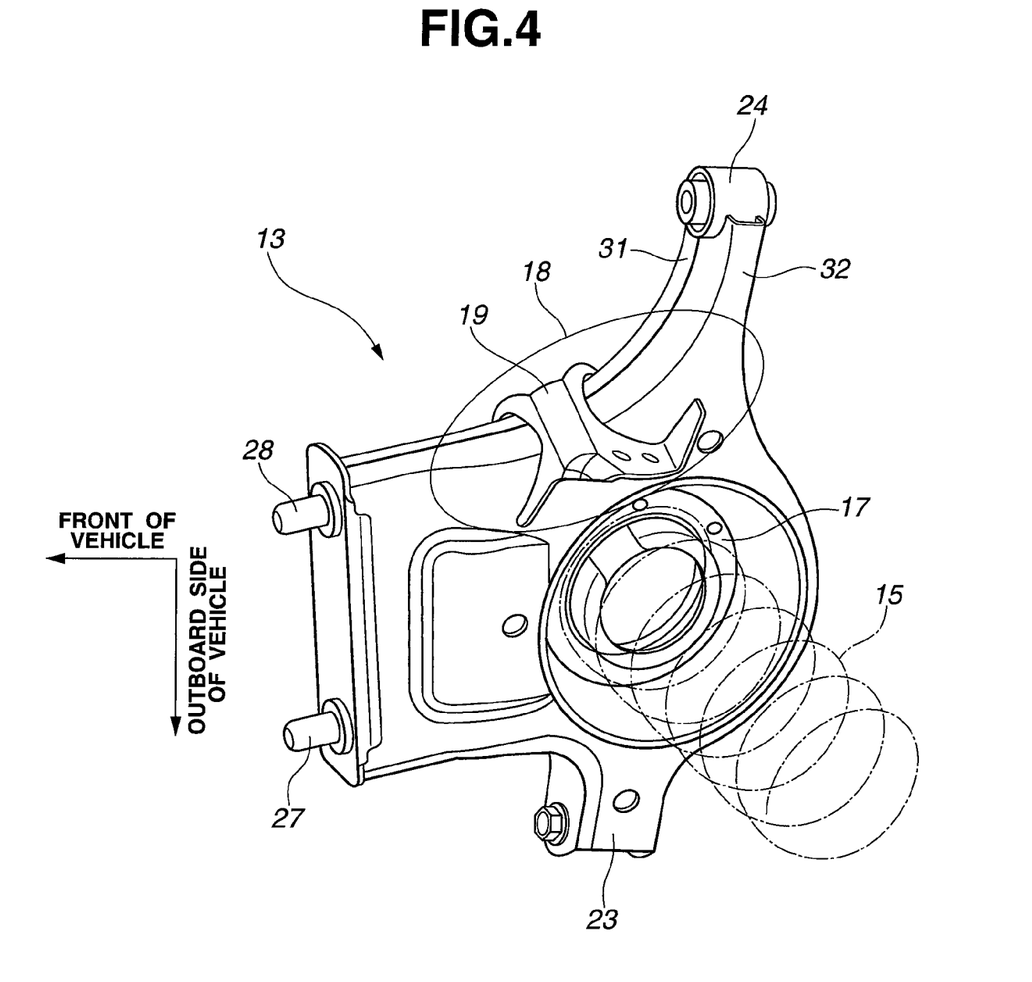
FIG. 4 is a view showing the outside of a lower rear link, hanging down during installation for the rear suspension of the embodiment on a suspension member.

Referring now to FIG. 4, there is shown the outside of lower rear link 13.

An annular lower spring seat 17 is interleaved between the lower end of coil spring 15 and lower rear link 13. That is, lower spring seat 17 is mounted on the lower rear link 13, and then the lower end of coil spring 15 is mounted on the lower spring seat 17.

Lower rear link 13 has a hollow structure comprised of thin-walled, recessed upper and lower halves (each formed into a substantially bean-jam wafer shape) fitted, mated, joined, or connected together in such a manner that their recessed portions oppose each other. In the shown embodiment, a lower bracket 31 corresponding to the lower half and an upper bracket 32 corresponding to the upper half are integrally connected to each other by welding (preferably, electric-arc welding).

As seen in FIG. 4, lower rear link 13 has a curved portion 18 whose cross section rapidly changes from the connection point (i.e., bush 24) of lower rear link 13 to suspension member 2 toward the inboard-side connection point (i.e., bush 28) of the front end of lower rear link 13 to the lower front link 12. A stiffening bracket 19 is connected to the curved portion 18 for holding and sandwiching lower and upper brackets 31-32 together by the stiffening bracket. Lower rear link 13 and stiffening bracket 19 are integrally connected to each other by electric-arc welding.

Lower spring seat 17 is mounted on the concave side (i.e., the bottom face of the inside) of lower bracket 31.

Coil spring 15, whose lower end is mounted on the lower spring seat 17, is laid out to protrude upward through an opening formed in the upper bracket 32.

Figure 5A:
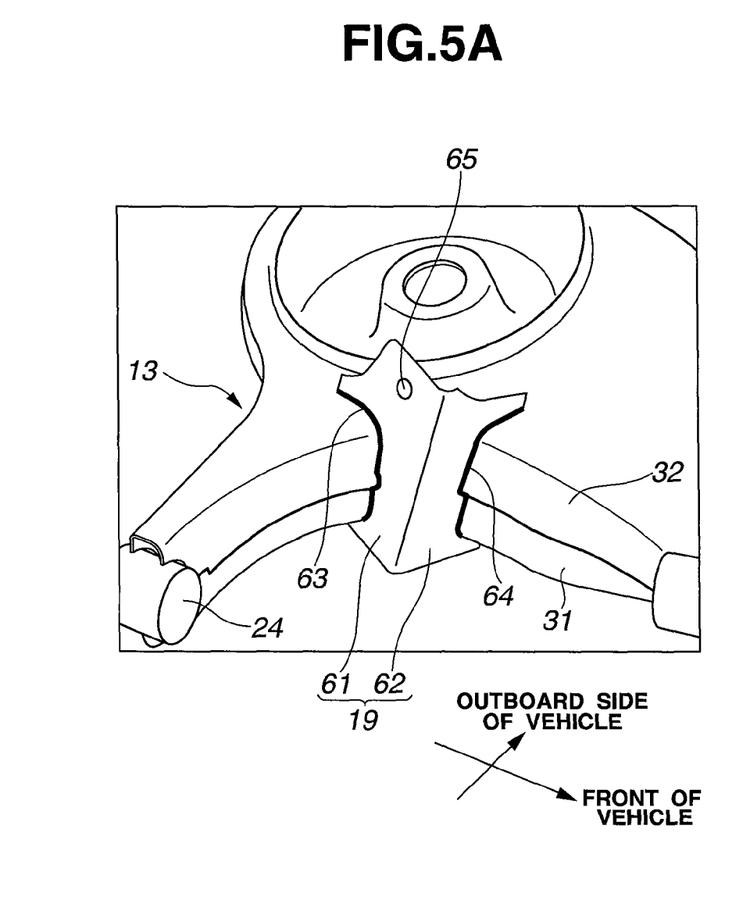
FIGS. 5A-5B are views illustrating the construction of a stiffening bracket of the suspension structure of the embodiment.
Figure 5B:
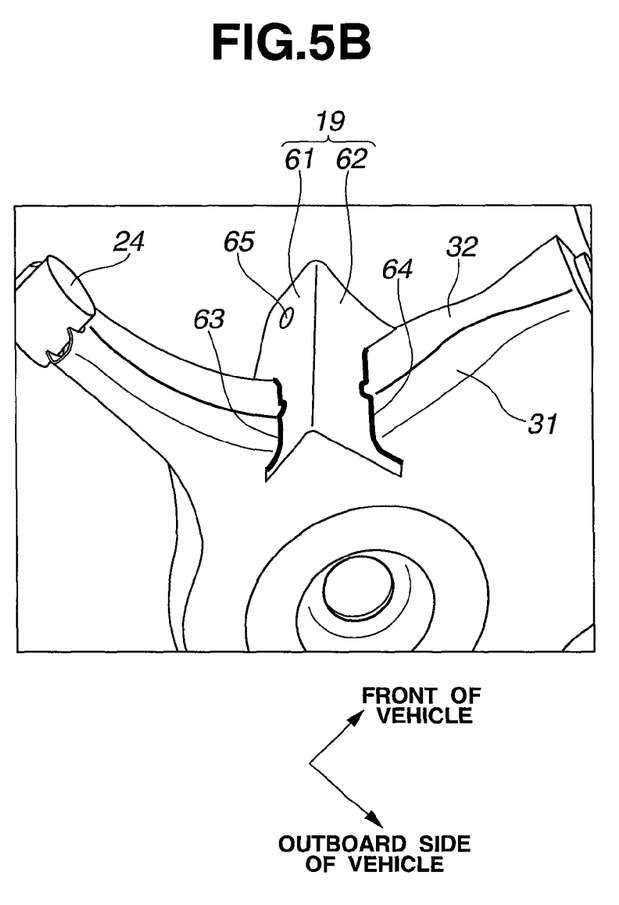

Referring now to FIGS. 5A-5B, there are shown the construction of a stiffening bracket of the suspension structure of the embodiment. FIG. 5A is the perspective view from the upside of suspension member 2, whereas FIG. 5B is the perspective view from the underside of suspension member 2.

Stiffening bracket 19 is formed of a steel material having a substantially V shape in cross section and bent in the form of mountain fold with respect to lower rear link 13. Stiffening bracket 19 includes a first sandwiching-and-holding structural section 61 facing and extending from a substantially right-angle angular section toward the connection point (i.e., bush 24) of lower rear link 13 to suspension member 2 and a second sandwiching-and-holding structural section 62 facing and extending from the angular section toward the inboard-side connection point (i.e., bush 28) of the front end of lower rear link 13 to the lower front link 12.

The vertical heights of first and second sandwiching-and-holding structural sections 61-62 are dimensioned to be greater than a vertical thickness of lower rear link 13. The edge of the first sandwiching-and-holding structural section 61, facing apart from the angular section, is formed as a first engagement edge 63 cut and configured to be substantially conformable to the shape of lower rear link 13, whereas the edge of the second sandwiching-and-holding structural section 62, facing apart from the angular section, is formed as a second engagement edge 64 cut and configured to be substantially conformable to the shape of lower rear link 13.

The first engagement edge 63 and the second engagement edge 64 are configured to be brought into sliding-contact with the outer peripheral surface of lower rear link 13 containing the end face (i.e., the underside) of lower bracket 31 facing apart from the mating face with the upper bracket 32 and the end face (i.e., the upside) of upper bracket 32 facing apart from the mating face with the lower bracket 31, when assembling. Therefore, stiffening bracket 19 is configured to hold and sandwich both the end face (i.e., the underside) of lower bracket 31 facing apart from the mating face with the upper bracket 32 and the end face (i.e., the upside) of upper bracket 32 facing apart from the mating face with the lower bracket 31 together.

Also, an upper part of the first sandwiching-and-holding structural section 61 above the upper bracket 32 is formed with a mounting hole 65 for mounting a stabilizer, a height sensor, or the like.

In the case that lower rear link 13 is merely formed as a hollow structure, there is a possibility of reduced durability of the suspension link owing to the occurrence of a stress concentration (high localized stresses) in the suspension link, induced by a load input from a coil spring, a shock absorber, a stabilizer, and so forth.

In contrast, in the case of the suspension structure of the embodiment, lower rear link 13 has a hollow structure in which lower bracket 31 and upper bracket 32 are fitted, mated, joined, or connected together, while opposing each other. Additionally, stiffening bracket 19 is integrally connected to both the lower bracket 31 and the upper bracket 32 for holding and sandwiching lower and upper brackets 31-32 together.

In this manner, lower and upper brackets 31-32 are held and sandwiched together by means of stiffening bracket 19 (stiffening bracket means). Hence, it is possible to enhance the total rigidity of lower rear link 13, and also to disperse stresses occurring in the suspension link (lower rear link 13), induced by a load input. Therefore, it is possible to enhance the durability of lower rear link 13.

By the way, the shape, layout, and number of component parts, constructing the suspension structure, are not limited to the particular embodiments described previously. As appreciated, various changes and modifications may be made without departing from the scope or spirit of this invention.

Hereupon, lower rear link 13 corresponds to a "suspension link", lower bracket 31 corresponds to a "first frame bracket" (suspension link means), and upper bracket 32 corresponds to a "second frame bracket".

[Effects]

(1) According to the suspension structure of the embodiment, lower rear link 13 has a hollow structure in which lower bracket 31 and upper bracket 32 are joined together, while opposing each other. Additionally, stiffening bracket 19 is integrally connected to both the lower bracket 31 and the upper bracket 32 for holding and sandwiching lower and upper brackets 31-32 together.

In this manner, lower and upper brackets 31-32 are held and sandwiched together by means of stiffening bracket 19. Hence, it is possible to enhance the total rigidity of lower rear link 13, and also to disperse stresses occurring in the suspension link (lower rear link 13), induced by a load input. Therefore, it is possible to enhance the durability of lower rear link 13.

(2) The stiffening bracket 19 is configured to hold and sandwich both the end face (i.e., the underside) of lower bracket 31 facing apart from the mating face with the upper bracket 32 and the end face (i.e., the upside) of upper bracket 32 facing apart from the mating face with the lower bracket 31 together.

In this manner, the underside of lower bracket 31 facing apart from the mating face with the upper bracket 32 and the upside of upper bracket 32 facing apart from the mating face with the lower bracket 31 are both held and sandwiched together by means of the stiffening bracket 19. Thus, it is possible to enhance the total rigidity of lower rear link 13, thereby enabling a dispersion of stresses occurring in the suspension link (lower rear link 13), induced by a load input. Therefore, it is possible to enhance the durability of lower rear link 13.

(3) According to the method of making the suspension link of the embodiment, the method includes joining a pair of frame brackets (i.e., lower and upper brackets 31-32) together, while opposing each other, to provide a hollow structure, and integrally connecting the stiffening bracket 19 to both the frame brackets (i.e., lower and upper brackets 31-32), for holding and sandwiching the frame brackets (i.e., lower and upper brackets 31-32) together.

In this manner, the frame brackets (i.e., lower and upper brackets 31-32) are both held and sandwiched together by means of the stiffening bracket 19. Thus, it is possible to enhance the total rigidity of lower rear link 13, thereby enabling a dispersion of stresses occurring in the suspension link (lower rear link 13), induced by a load input. Therefore, it is possible to enhance the durability of lower rear link 13.

Second Embodiment

[Construction]

In the second embodiment, one end of a stabilizer 66 is installed or connected to the mounting hole 65 of stiffening bracket 19.

Figure 6A:
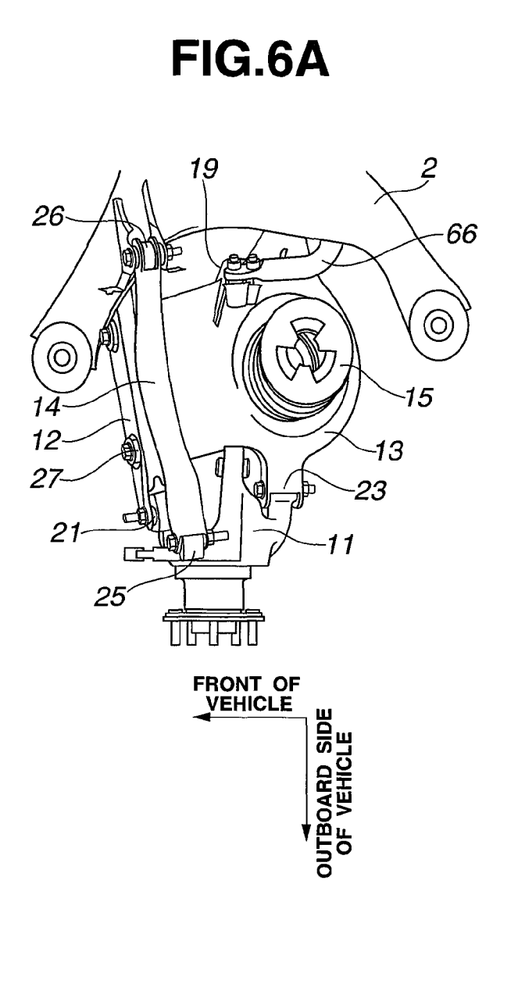
FIGS. 6A-6B are views illustrating the construction of the rear-left suspension of the embodiment on which a stabilizer is mounted.
Figure 6B:
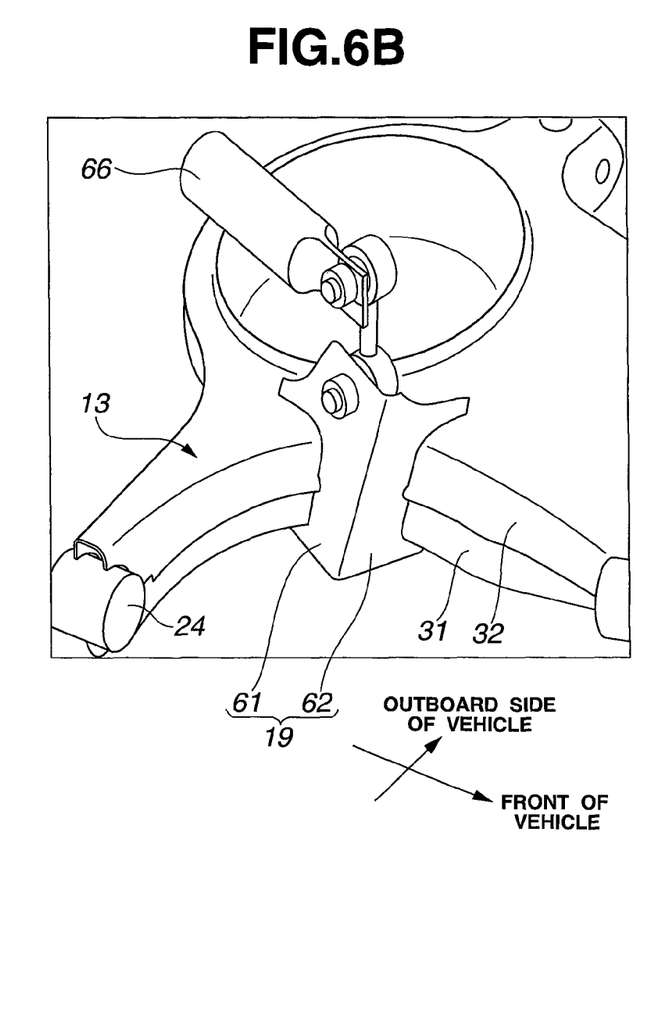

Referring now to FIGS. 6A-6B, there are shown the construction of the rear-left suspension of the second embodiment on which the stabilizer is mounted. FIG. 6A is the perspective side view from the outboard side of the vehicle, whereas FIG. 6B is the perspective view from the upside of suspension member 2.

As clearly seen in FIGS. 6A-6B, one end of stabilizer 66 is mechanically linked or connected via a stabilizer connecting rod to the mounting hole 65 of stiffening bracket 19.

[Operation]

Hereunder described are the analysis results of load-input durability of comparative structures (comparative examples) and the suspension structure of the embodiment under a condition where stabilizer 66 is mounted on the stiffening bracket 19.

Figure 7:
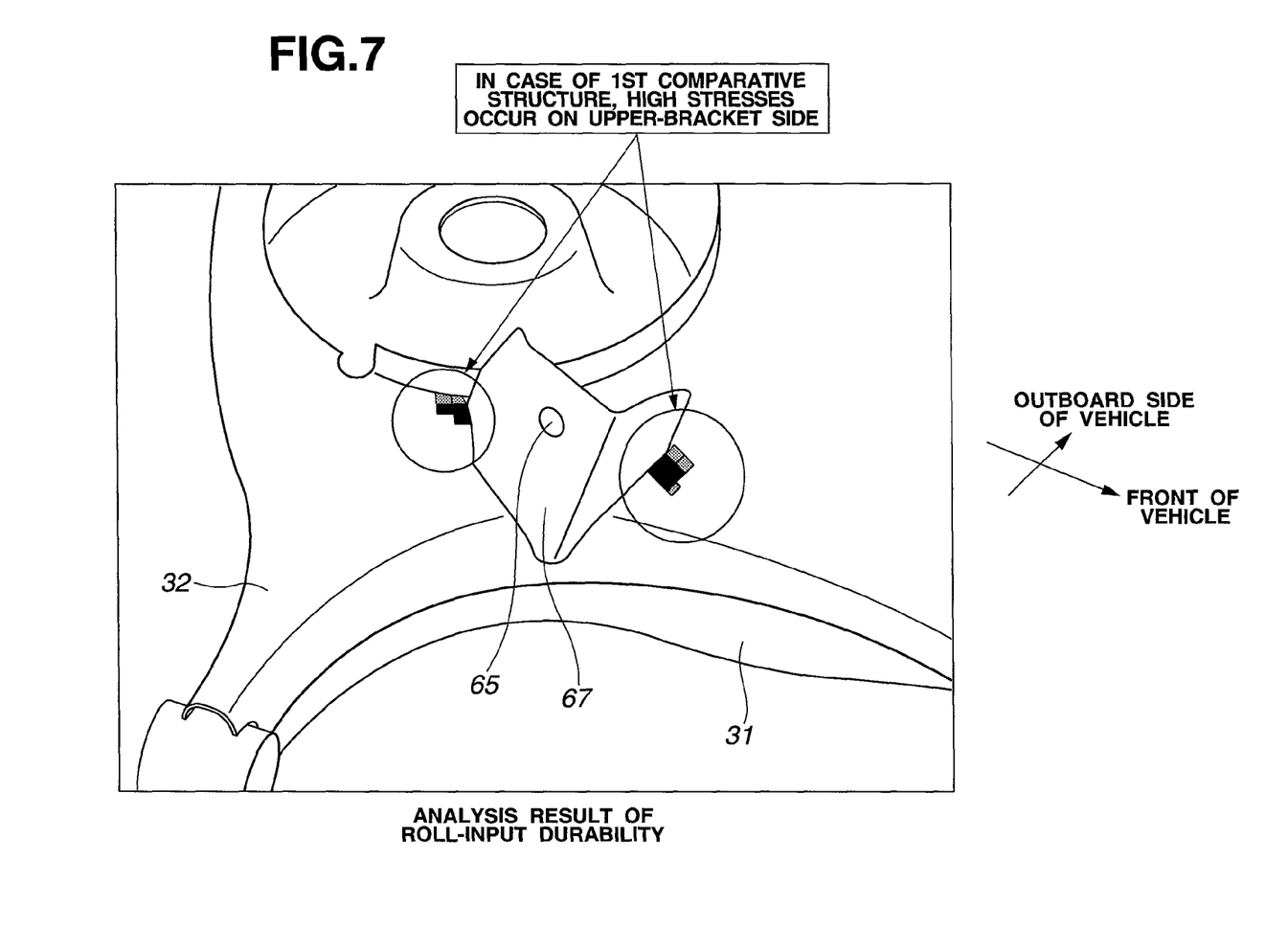
FIG. 7 is a view illustrating the analysis result of a roll-input durability in a first comparative structure with a substantially V-shaped mounting bracket.

Referring now to FIG. 7, there is shown the analysis result of a roll-input durability in the first comparative structure with a substantially V-shaped mounting bracket.

The first comparative example adopts a suspension structure where a mounting bracket 67, having a substantially V-shaped cross section, is integrally connected to the upside of upper bracket 32. Under a condition where one end of stabilizer 66 is connected to the substantially V-shaped mounting bracket 67, the durability of a roll-input that stabilizer 66 is actually functioning is analyzed. For the sake of simplicity, in FIG. 7, stabilizer 66 is not shown.

As appreciated from the analysis result of roll-input durability of FIG. 7, high stresses tend to occur mainly on the upside of upper bracket 32.

Figure 8A:
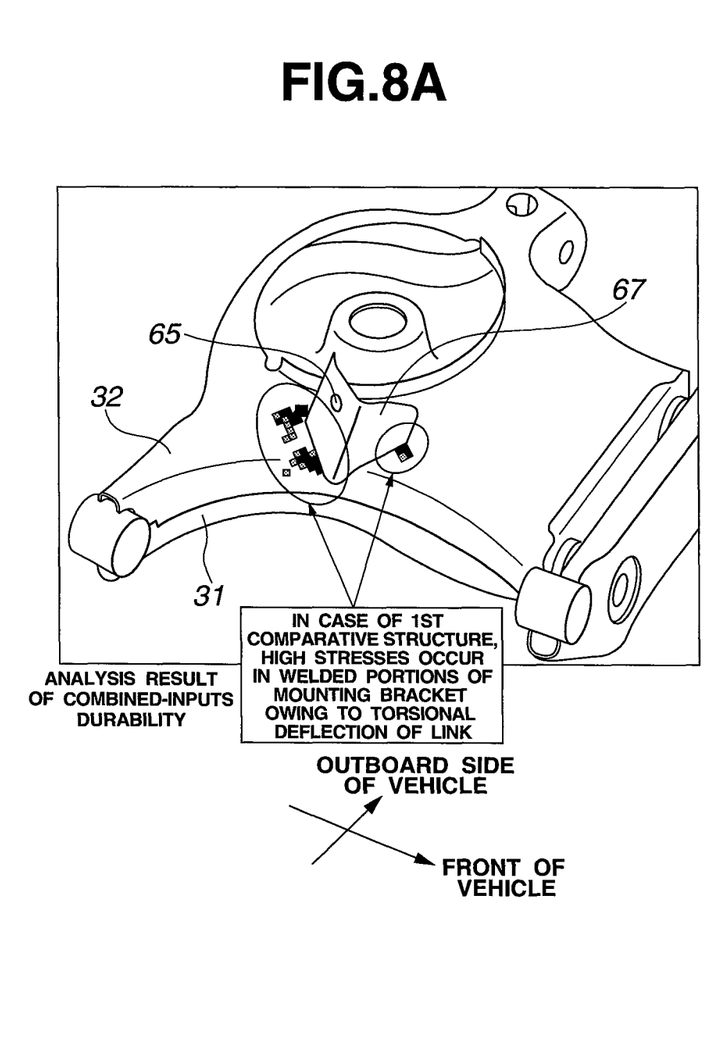
FIGS. 8A-8B are views illustrating the analysis result of a combined-inputs durability in the first comparative structure with the substantially V-shaped mounting bracket.
Figure 8B:
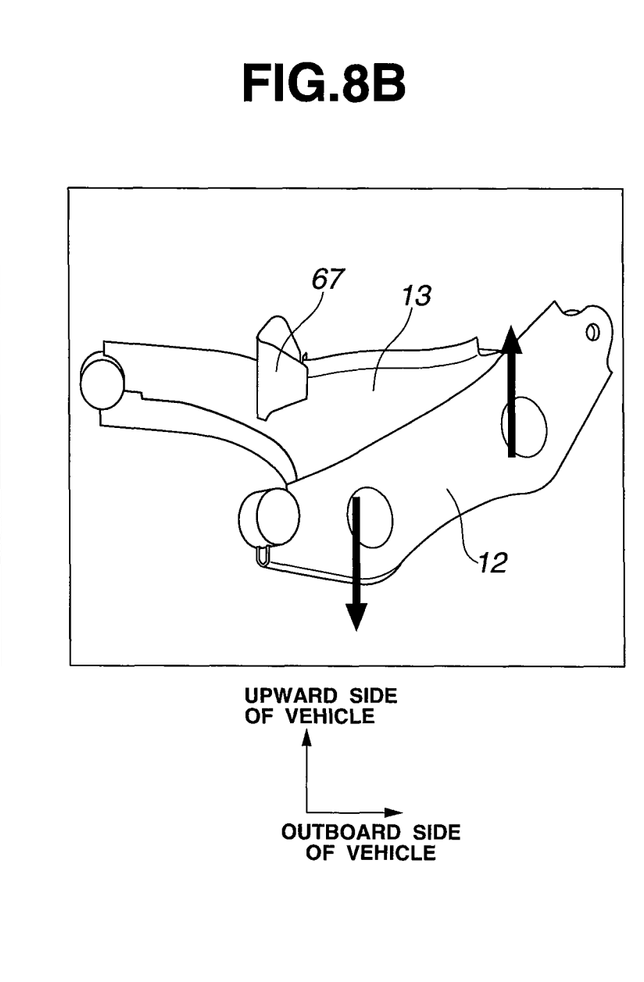

Referring now to FIGS. 8A-8B, there is shown the analysis result of a combined-inputs durability in the first comparative structure with a substantially V-shaped mounting bracket. FIG. 8A is the perspective view from the upside of suspension member 2, whereas FIG. 8B is the front view from the front end of lower front link 12.

In a similar manner to FIG. 7, the first comparative example shown in FIGS. 8A-8B also adopts a suspension structure where a mounting bracket 67, having a substantially V-shaped cross section, is integrally connected to the upside of upper bracket 32. Under a condition where one end of stabilizer 66 is connected to the substantially V-shaped mounting bracket 67, the durability of combined-inputs that there is a load input from a coil spring, a shock absorber, a stabilizer, and so forth and/or there is a lateral-force input from the road wheel 1 during cornering is analyzed. For the sake of simplicity, in FIGS. 8A-8B, stabilizer 66 is not shown.

As appreciated from the analysis result of combined-inputs durability, as shown in FIG. 8B, both ends of lower front link 12 are displaced in the two opposite directions, namely in the upward and downward directions of the vehicle. As a result, high stresses tend to occur mainly in welded portions of mounting bracket 67 to upper bracket 32 owing to torsional deflections of lower front link 12 and lower rear link 13.

Figure 9A:
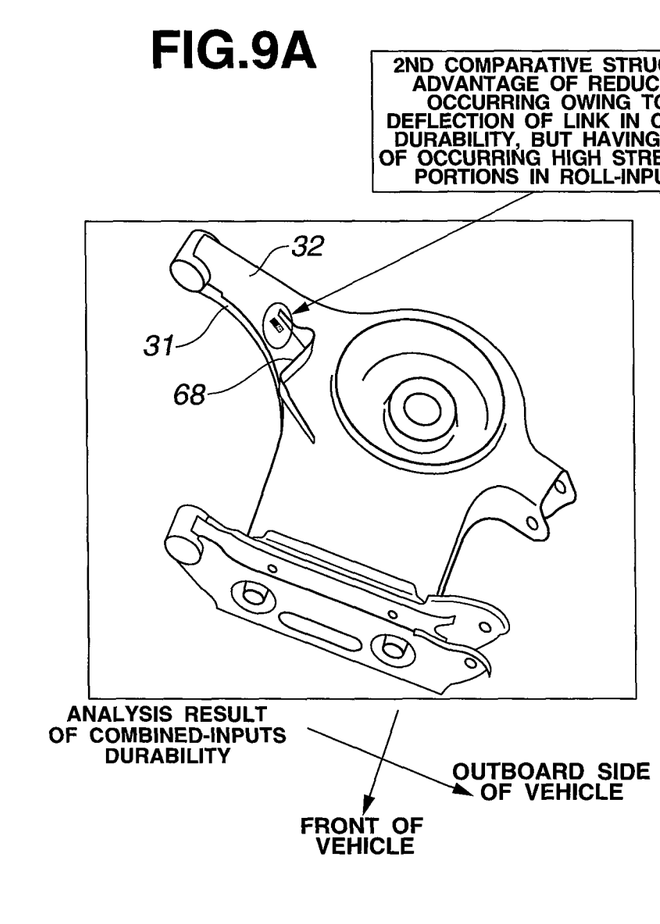
FIGS. 9A-9B are views illustrating the analysis results of a combined-inputs durability and a roll-input durability in a second comparative structure with a crank-shaped mounting bracket.
Figure 9B:
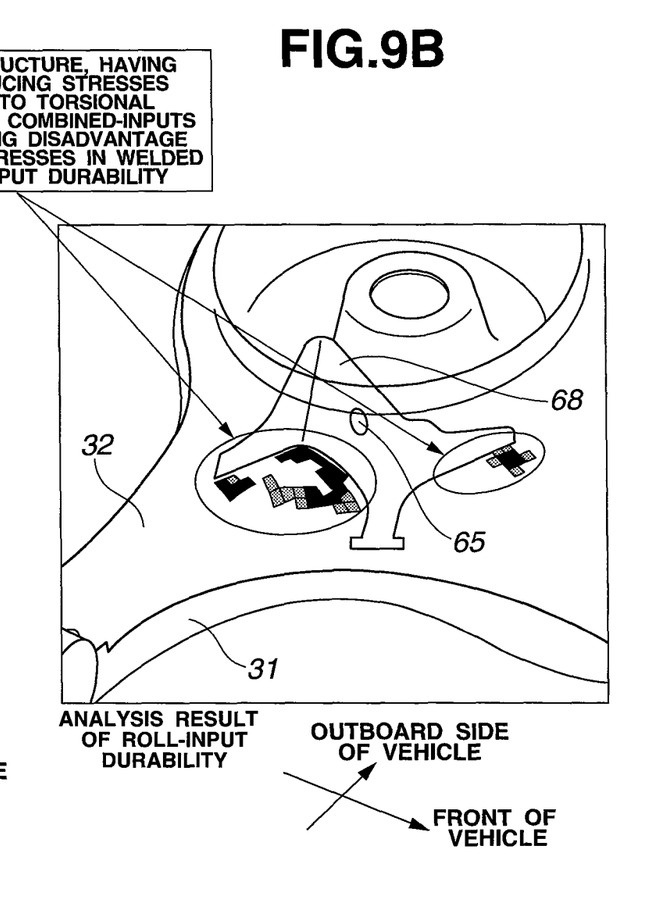

Referring now to FIGS. 9A-9B, there are shown the analysis results of a combined-inputs durability and a roll-input durability in the second comparative structure with a crank-shaped mounting bracket. FIG. 9A is the perspective view from the upside of the anterior part of the vehicle body, whereas FIG. 9B is the perspective view from the upside of suspension member 2.

The second comparative example adopts a suspension structure where a mounting bracket 68, having a crank-shaped cross section, is integrally connected to the upside of upper bracket 32. Under a condition where one end of stabilizer 66 is connected to the crank-shaped mounting bracket 68, (i) the durability of combined-inputs (see FIG. 9A) that there is a load input from a coil spring, a shock absorber, a stabilizer, and so forth and/or there is a lateral-force input from the road wheel 1 during cornering and (ii) the durability of a roll-input (see FIG. 9B) that stabilizer 66 is actually functioning are analyzed. For the sake of simplicity, in FIGS. 9A-9B, stabilizer 66 is not shown.

As appreciated from the analysis result of combined-inputs durability, as shown in FIG. 9A, the second comparative structure has the advantage of reducing stresses occurring owing to torsional deflections of lower front link 12 and lower rear link 13. However, as appreciated from the analysis result of roll-input durability, as shown in FIG. 9B, the second comparative has the disadvantage of occurring high stresses mainly welded portions of mounting bracket 68 to upper bracket 32.

Figure 10A:
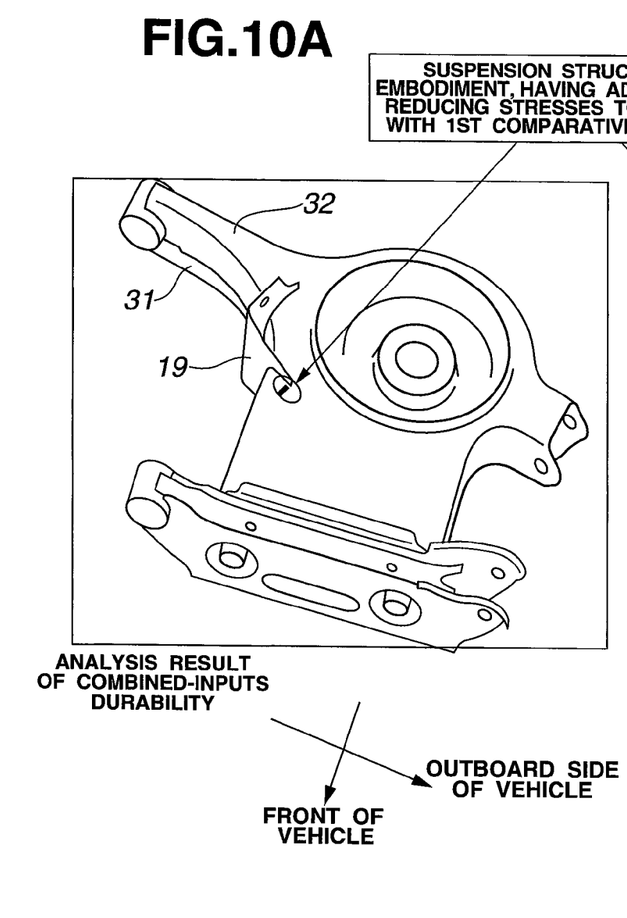
FIGS. 10A-10B are views illustrating the analysis result of a combined-inputs durability in the suspension structure of the embodiment with the stiffening bracket.
Figure 10B:
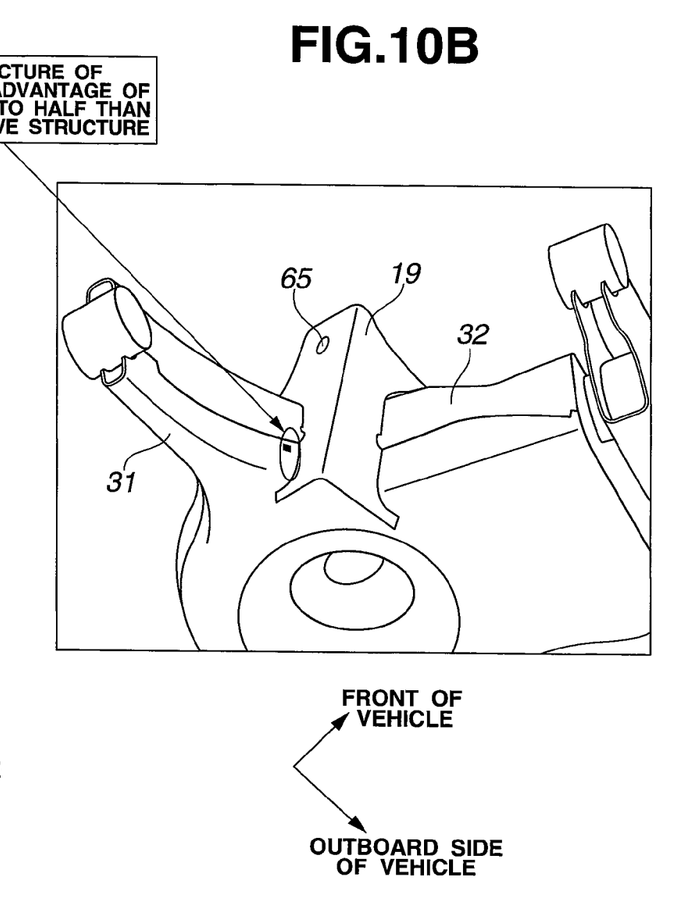

Referring now to FIGS. 10A-10B, there is shown the analysis result of a combined-inputs durability in the suspension structure of the embodiment with the stiffening bracket 19. FIG. 10A is the perspective view from the upside of the anterior part of the vehicle body, whereas FIG. 10B is the perspective view from the underside of suspension member 2.

Under a condition where one end of stabilizer 66 is connected to the stiffening bracket 19, the durability of combined-inputs (see FIGS. 10A-10B) that there is a load input from a coil spring, a shock absorber, a stabilizer, and so forth and/or there is a lateral-force input from the road wheel 1 during cornering is analyzed. For the sake of simplicity, in FIGS. 10A-10B, stabilizer 66 is not shown.

As appreciated from the analysis result of combined-inputs durability, as shown in FIGS. 10A-10B, the suspension structure of the embodiment has the advantage of reducing stresses to half than with the first comparative structure with the substantially V-shaped mounting bracket 67.

Figure 11A:
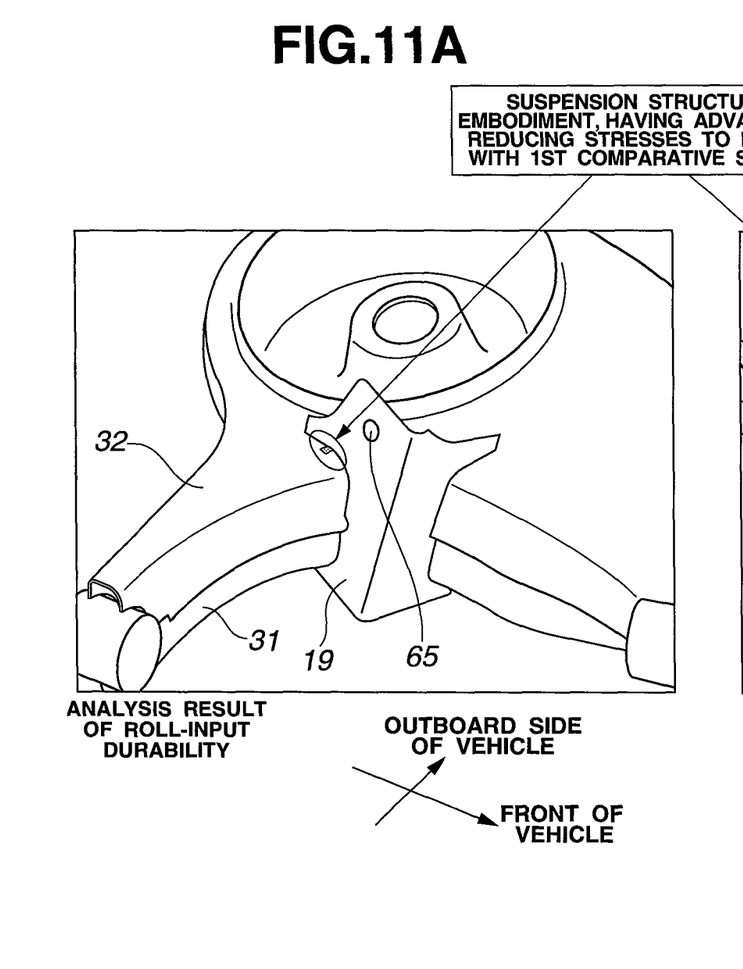
FIGS. 11A-11B are views illustrating the analysis result of a roll-input durability in the suspension structure of the embodiment with the stiffening bracket.
Figure 11B:
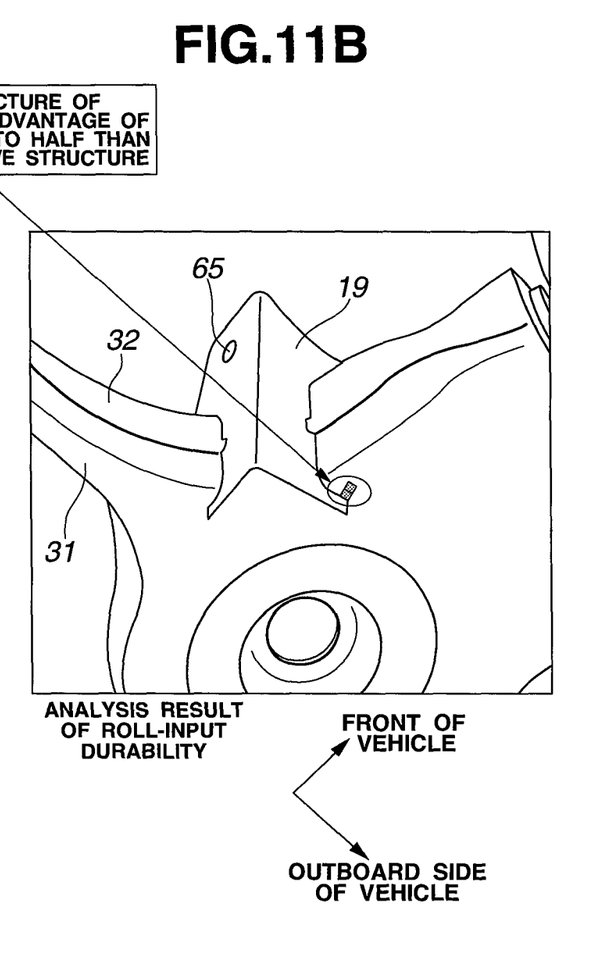

Referring now to FIGS. 11A-11B, there is shown the analysis result of a roll-input durability in the suspension structure of the embodiment with the stiffening bracket 19. FIG. 11A is the perspective view from the upside of suspension member 2, whereas FIG. 11B is the perspective view from the underside of suspension member 2.

The embodiment adopts an improved suspension structure where the stiffening bracket 19 is integrally connected to both the lower bracket 31 and the upper bracket 32 for holding and sandwiching lower and upper brackets 31-32 together. Under a condition where one end of stabilizer 66 is connected to the stiffening bracket 19, the durability of a roll-input that stabilizer 66 is actually functioning is analyzed. For the sake of simplicity, in FIGS. 11A-11B, stabilizer 66 is not shown.

As appreciated from the analysis result of roll-input durability of FIGS. 11A-11B, the suspension structure of the embodiment has the advantage of reducing stresses to half than with the first comparative structure with the substantially V-shaped mounting bracket 67.

Figure 12A:
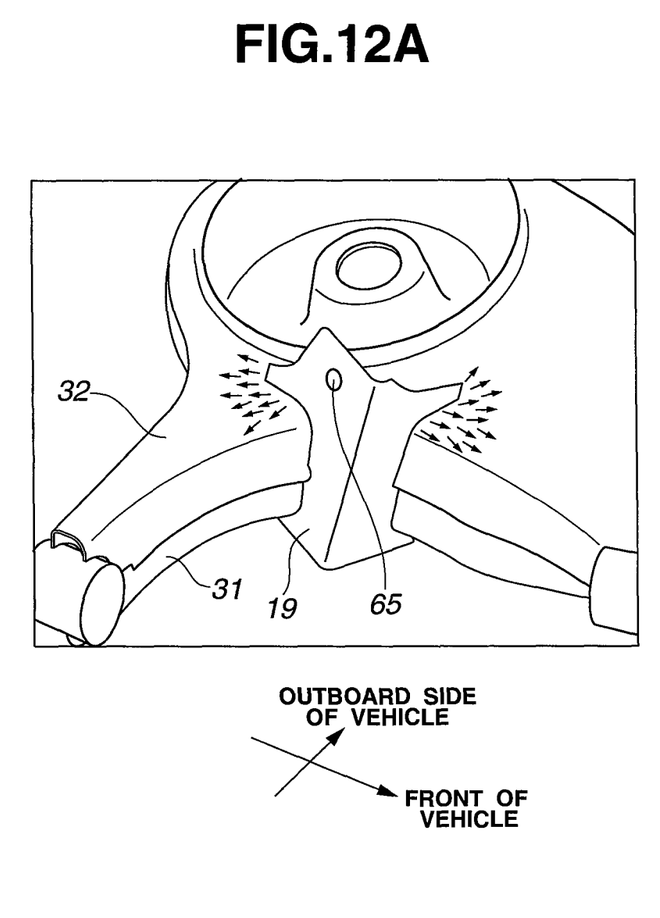
FIGS. 12A-12B are views illustrating a stress dispersion in a roll-input durability test in the suspension structure of the embodiment with the stiffening bracket.
Figure 12B:
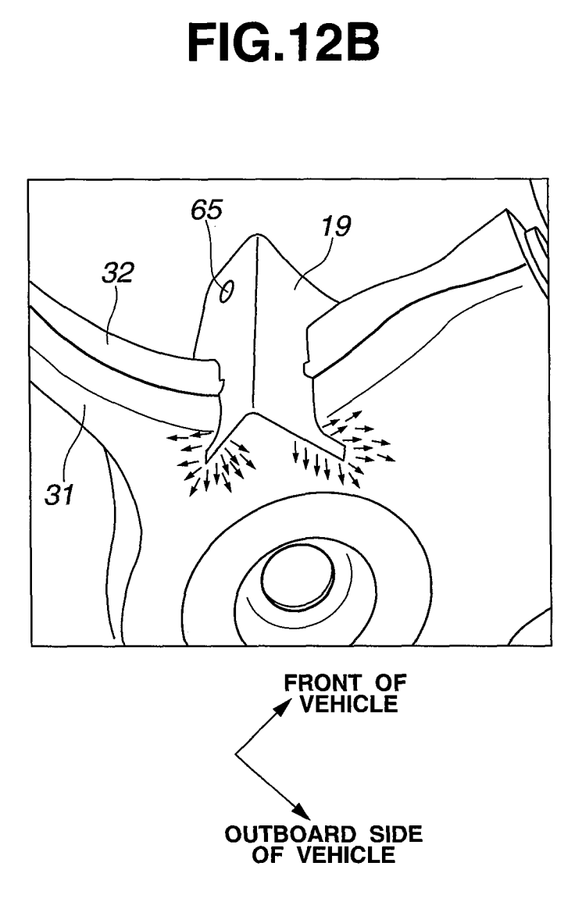

Referring now to FIGS. 12A-12B, there is shown a stress dispersion in a roll-input durability test in the suspension structure of the embodiment with the stiffening bracket 19. FIG. 12A is the perspective view from the upside of suspension member 2, whereas FIG. 12B is the perspective view from the underside of suspension member 2. For the sake of simplicity, in FIGS. 12A-12B, stabilizer 66 is not shown.

In the presence of a roll-input that stabilizer 66 is actually functioning, localized shearing forces, induced by a load input from the stabilizer 66, act on the stiffening bracket 19 in a direction that the stiffening bracket 19 is torn off. However, by virtue of in-plane deformation of stiffening bracket 19, it is possible to disperse stresses occurring in the suspension link (lower rear link 13), induced by the load input. Therefore, it is possible to enhance the durability of lower rear link 13.

Additionally, according to the multi-link suspension structure of the embodiment, a first lower link (lower front link 12) and a second lower link (lower rear link 13) are connected to each other, thus ensuring the total rigidity balance of the multi-link rear suspension in the longitudinal and lateral directions of the vehicle.

Furthermore, the first lower link (lower front link 12) and the second lower link (lower rear link 13) are connected to each other at two points, thus enhancing the lateral rigidity of the multi-link rear suspension and enabling a dispersion of stresses occurring in the suspension link (lower rear link 13).

Moreover, the two points are constructed by elastic linking bushes 27-28, each of which has a bush axis directed substantially in the longitudinal direction of the vehicle, thus realizing a rigidity balance of a comparatively weak longitudinal rigidity and a comparatively strong lateral rigidity in the multi-link rear suspension.

Additionally, the stiffening bracket 19 is integrally connected to both the frame brackets 31-32 of the suspension link (lower rear link 13) serving as the second lower link arranged in rear of the first lower link (lower front link 12), thus enabling load inputs acting in the vertical direction as well as in the longitudinal direction of the vehicle to be dispersed to the stabilizer as well as the lower link.

Furthermore, the stiffening bracket 19 has sliding-contact edges 63-64 kept in sliding-contact with the outer peripheral surface of the second lower link (lower rear link 13) to permit input loads transmitted from one end of the stabilizer 66 to the stiffening bracket 19 to be effectively dispersed, thus enabling torsional input loads to be satisfactorily supported by means of the sliding-contact surfaces.

[Modification]

The suspension structure of the embodiment is exemplified in a rear suspension of an automotive vehicle in which one end of stabilizer 66 is connected to the mounting hole 65 of stiffening bracket 19. If possible, another member may be connected to the mounting hole 65 of stiffening bracket 19. For instance, a height sensor 69, which is often used for optical-axis control for a head lamp or height control for an air suspension system may be connected to the stiffening bracket 19.

Figure 13:
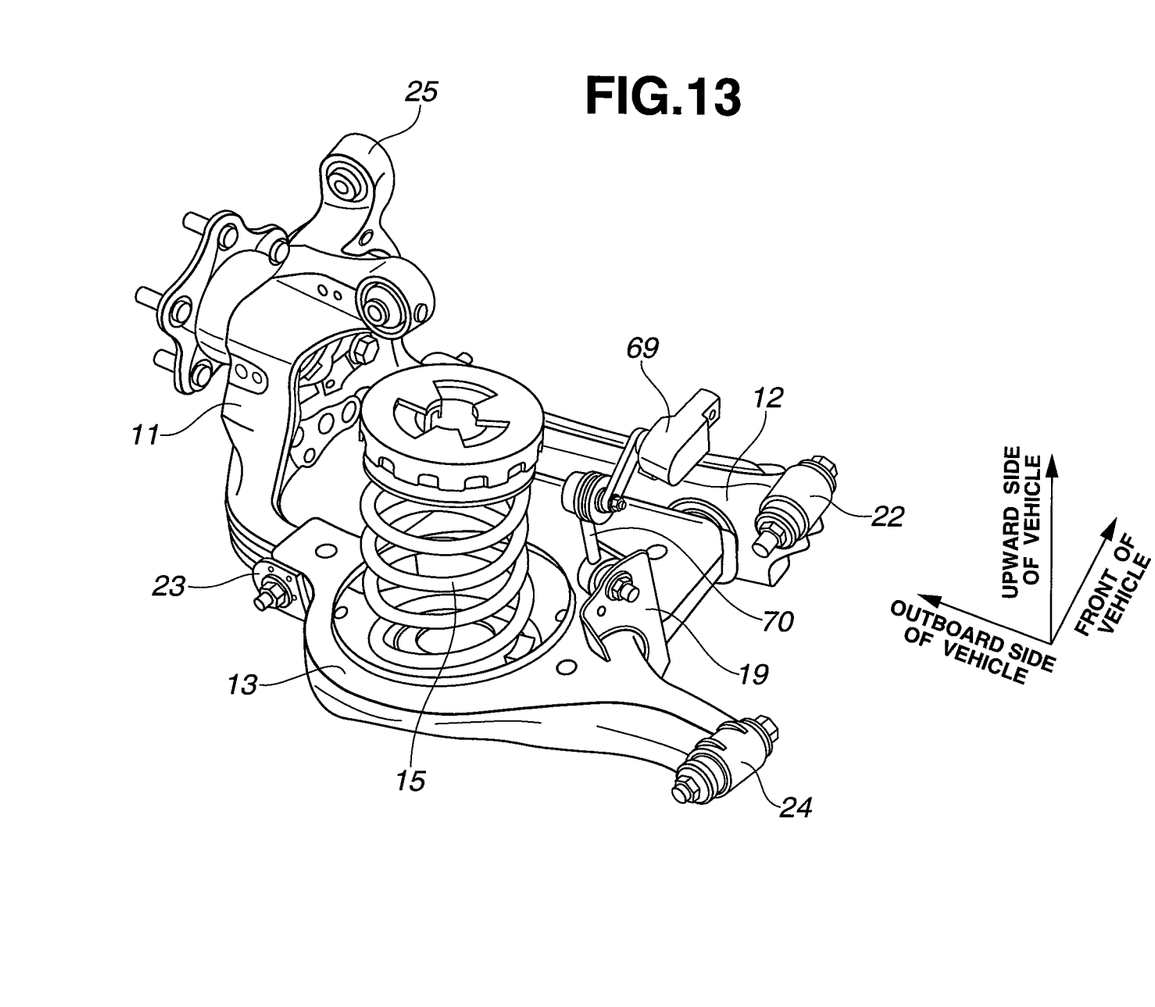
FIG. 13 is a view illustrating the construction of the rear-left suspension of a modification on which a height sensor is mounted.

Referring now to FIG. 13, there is shown the construction of the rear-left suspension of the modification on which a part of height sensor 69 is connected via a connecting rod 70 to the mounting hole 65 of stiffening bracket 19.

As described previously, for the purpose of stiffening the suspension link (lower rear link 13), while permitting stresses occurring in the suspension link, induced by a load input, to be effectively dispersed, stiffening bracket 19 is connected to both the lower bracket 31 and the upper bracket 32 for holding and sandwiching lower and upper brackets 31-32 together. Stiffening bracket 19 may be configured to also serve as a mounting bracket. This contribute to reduced component parts.

The entire contents of Japanese Patent Application No. 2011-109667 (filed May 16, 2011) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A suspension structure comprising:
a suspension link through which a road wheel and a vehicle body are pivotably connected to each other;
the suspension link having a hollow structure in which a pair of frame brackets, including a first frame bracket and a second frame bracket, are joined together, while opposing each other; and
a stiffening bracket integrally connected to both the frame brackets for holding and sandwiching the frame brackets together,
wherein the stiffening bracket is configured to hold and sandwich together an end face of the first frame bracket facing apart from a mating face with the second frame bracket and an end face of the second frame bracket facing apart from the mating face with the first frame bracket.

2. The suspension structure as claimed in claim 1, wherein:
one end of a stabilizer is connected to the stiffening bracket.

3. The suspension structure as claimed in claim 2, further comprising:
a first lower link configured to link an axle housing to the vehicle body;
wherein the suspension link serves as a second lower link configured to link the axle housing to the vehicle body and arranged in rear of the first lower link in a longitudinal direction of the vehicle body, and
wherein the first lower link and the second lower link are connected to each other.

4. The suspension structure as claimed in claim 3, wherein:
the first lower link and the second lower link are connected to each other at two points.

5. The suspension structure as claimed in claim 4, wherein:
the two points are constructed by elastic linking bushes, each of which has a bush axis directed substantially in the longitudinal direction of the vehicle.

6. The suspension structure as claimed in claim 5, wherein:
the stiffening bracket is integrally connected to both the frame brackets of the suspension link serving as the second lower link arranged in rear of the first lower link.

7. The suspension structure as claimed in claim 6, wherein:
the stiffening bracket has sliding-contact edges kept in sliding-contact with an outer peripheral surface of the second lower link to permit an input load transmitted from the one end of the stabilizer to the stiffening bracket to be dispersed.

8. A method of making a suspension link, which comprises:
joining together a pair of frame brackets, including a first frame bracket and a second frame bracket, while opposing each other, to provide a hollow structure; and
integrally connecting a stiffening bracket to both the frame brackets, for holding and sandwiching together an end face of the first frame bracket facing apart from a mating face with the second frame bracket and an end face of the second frame bracket facing apart from the mating face with the first frame bracket.

9. A suspension structure comprising:
a suspension link means through which a road wheel and a vehicle body are pivotably connected to each other;
the suspension link means having a hollow structure in which a pair of frame brackets, including a first frame bracket and a second frame bracket, are joined together, while opposing each other; and
a stiffening bracket means integrally connected to both the frame brackets for holding and sandwiching the frame brackets together,
wherein the stiffening bracket means is configured to hold and sandwich together an end face of the first frame bracket facing apart from a mating face with the second frame bracket and an end face of the second frame bracket facing apart from the mating face with the first frame bracket.

\* \* \* \* \*